United States Patent
Takahashi

(10) Patent No.: US 8,520,231 B2
(45) Date of Patent: Aug. 27, 2013

(54) RECORD/REPLAY APPARATUS AND METHOD THAT DISPLAY MOVING IMAGES AND STILL IMAGES GENERATED FROM MOVING IMAGES

(75) Inventor: Kazuhiro Takahashi, Saitama-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1448 days.

(21) Appl. No.: 11/221,319

(22) Filed: Sep. 7, 2005

(65) Prior Publication Data

US 2006/0050321 A1 Mar. 9, 2006

(30) Foreign Application Priority Data

Sep. 7, 2004 (JP) ................................ 2004-259980

(51) Int. Cl.
*G06F 3/12* (2006.01)
*H04N 5/222* (2006.01)
*H04N 5/225* (2006.01)

(52) U.S. Cl.
USPC ................... 358/1.15; 348/207.2; 348/333.05

(58) Field of Classification Search
USPC ................... 358/296, 1.15, 1.14; 348/207.2, 348/333.01, 333.02, 33.05, 333.12, 333.05
See application file for complete search history.

(56) References Cited

U.S. PATENT DOCUMENTS

| | | | |
|---|---|---|---|
| 5,990,860 A * | 11/1999 | Takeuchi | 345/667 |
| 6,295,086 B1 * | 9/2001 | Fukushima et al. | 348/231.1 |
| 6,618,491 B1 * | 9/2003 | Abe | 382/107 |
| 6,785,013 B1 * | 8/2004 | Ota et al. | 358/1.15 |
| 7,057,745 B1 * | 6/2006 | Tanaka et al. | 358/1.1 |
| 7,221,478 B2 * | 5/2007 | Wada et al. | 358/1.9 |
| 7,325,199 B1 * | 1/2008 | Reid | 715/723 |
| 7,345,783 B2 * | 3/2008 | Suzuki et al. | 358/1.18 |
| 2004/0202456 A1 * | 10/2004 | Sasagawa | 386/120 |
| 2005/0165840 A1 * | 7/2005 | Pratt et al. | 707/104.1 |

FOREIGN PATENT DOCUMENTS

| | | | |
|---|---|---|---|
| JP | 2000-138883 A | | 5/2000 |
| JP | 2001-320665 A | | 11/2001 |
| JP | 2002-094904 | | 3/2002 |
| JP | 2004-064285 A | | 2/2004 |

OTHER PUBLICATIONS

The above references were cited in a Jul. 17, 2009 Japanese Office Action that issued in Japanese Patent Application No. 2004-259980, of which is enclosed without English Translation.

* cited by examiner

*Primary Examiner* — Benny Tieu
*Assistant Examiner* — Sunil Chacko
(74) *Attorney, Agent, or Firm* — Cowan, Liebowitz & Latman, P.C.

(57) ABSTRACT

This invention includes a file management unit having a moving image directory and a still image directory, a print file producing unit which produces a still image file under the still image directory as a print list, and a still image extraction unit which extracts a still image of a designated scene from a moving image file under the moving image directory. When a print list of designated scenes of the moving image is to be produced, the still image extracted by the still image extraction unit is recorded under the still image directory, and the still image is registered in a print list by the print file producing unit.

30 Claims, 16 Drawing Sheets

FIG. 4

| NAME | CONTENTS | BYTE COUNT |
|---|---|---|
| NumFile | TOTAL FILE COUNT | 4 |
| Offset | OFFSET TO NEXT DATA | 4 |
| FileInfo [NumFile] | FILE INFORMATION | NumFile*32 |
| | OTHER MANAGEMENT DATA | |

FIG. 5

FileInfo[]

| NAME | CONTENTS | BYTE COUNT |
|---|---|---|
| FileID | FILE NAME | 2 |
| NumPrintIndex | PRINT INDEX COUNT | 1(max5) |
| PrintIndexInfo 0 | INDEX INFORMATION 0 | 5 |
| PrintIndexInfo 1 | INDEX INFORMATION 1 | 5 |
| PrintIndexInfo 2 | INDEX INFORMATION 2 | 5 |
| PrintIndexInfo 3 | INDEX INFORMATION 3 | 5 |
| PrintIndexInfo 4 | INDEX INFORMATION 4 | 5 |
| | OTHER PIECES OF FILE INFORMATION | |

FIG. 6

PrintIndexInfoN

| NAME | CONTENTS | BYTE COUNT |
|---|---|---|
| IsPrintIndex | PRESENCE/ABSENCE OF PRINT INDEX | 1 |
| OffsetTime | OFFSET TIME | 5 |
| IsDPOF | CONFORMITY WITH DPOF | 1 |
| IsPrinted | PRINTED | 1 |
| NumPrint | PRINT COUNT | 4 |
| PrintStyle | PRINT STYLE | 4 |
| PrintPos | PRINT POSITION | 8 |
| OTHER PIECES OF PRINT INFORMATION | | |

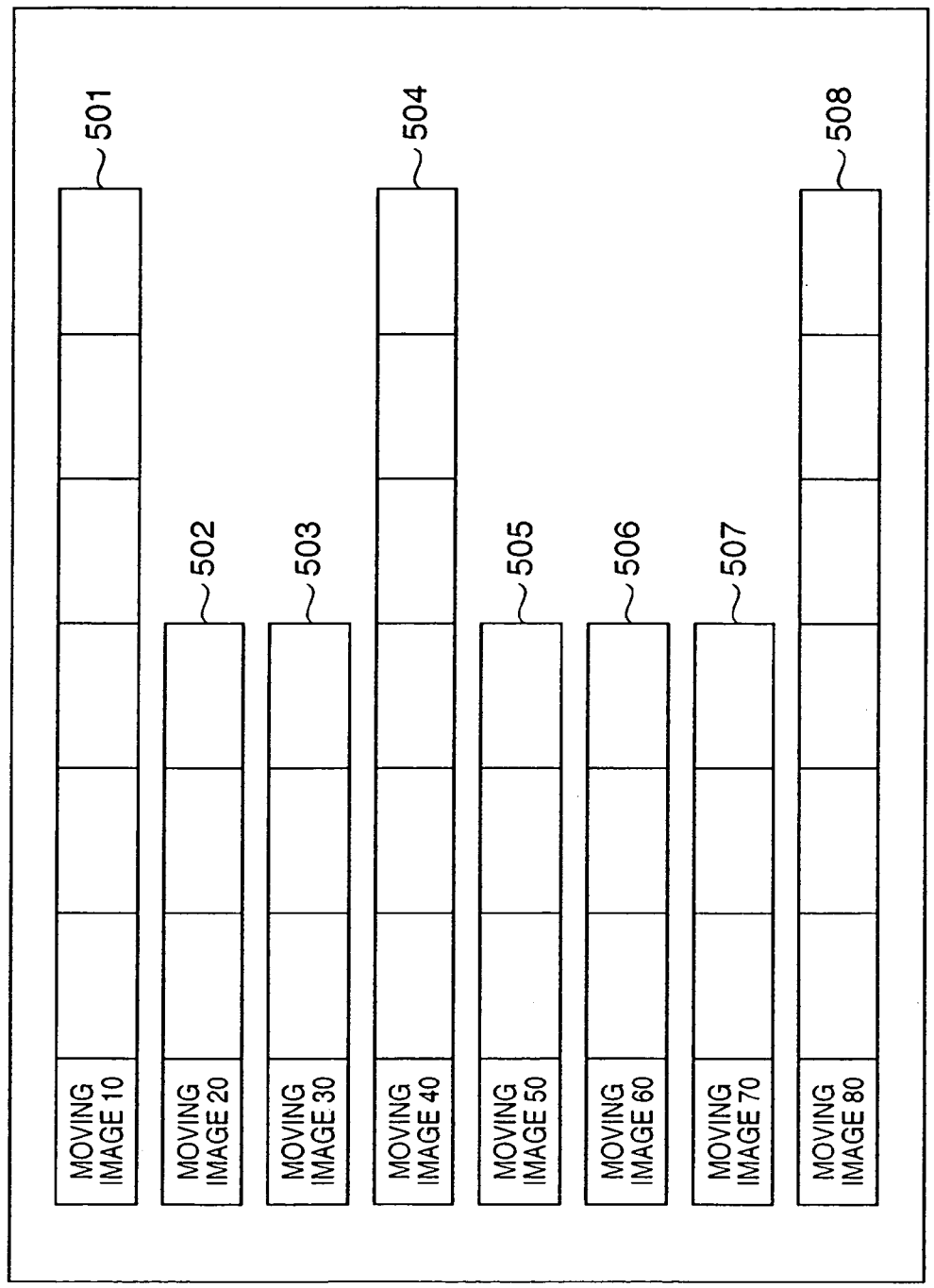

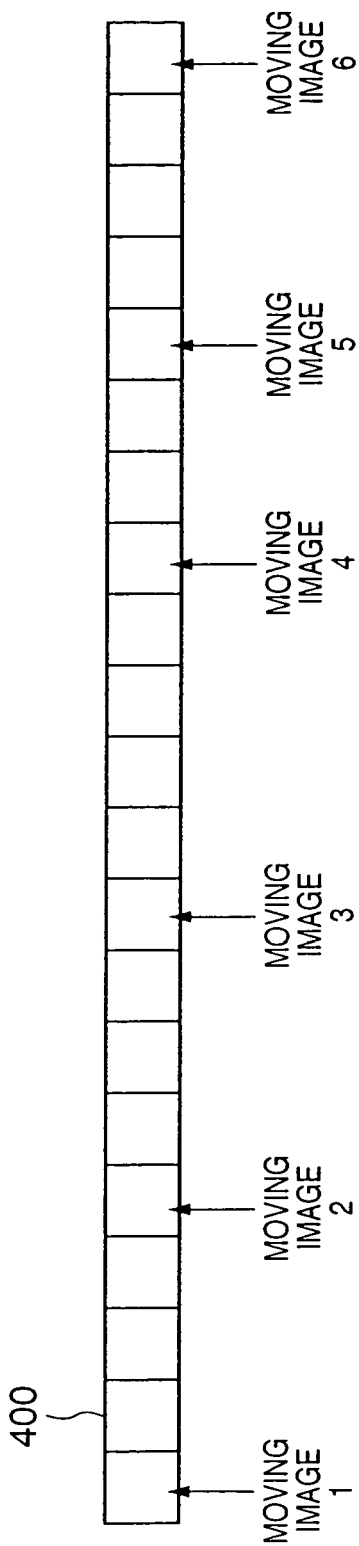

RECORD/REPLAY APPARATUS AND METHOD THAT DISPLAY MOVING IMAGES AND STILL IMAGES GENERATED FROM MOVING IMAGES

FIELD OF THE INVENTION

The present invention relates to a technique for producing print information from moving image information or still image information recorded on recording media.

BACKGROUND OF THE INVENTION

When images are to be recorded on a recording medium by a conventional digital image capturing device such as a digital still camera or digital video camera, the images are generally recorded by using the directories shown in FIG. 15.

FIG. 15 shows an example of the directories generally used in a conventional digital camera, digital video camera, or the like. A still image directory and print directory exist under a root directory in accordance with a given protocol. In this example, the still image directory is stored in accordance with a digital camera format (to be referred to as DCF hereinafter) protocol. Subdirectories "100JPEG" and "101JPEG" exist under directory "DCIM". Under these subdirectories, there are recorded still image files with file names "STL_0001.JPG", "STL_0003.JPG", . . . , "STL_1002.JPG", "STL_1003.JPG", . . . . Recording such files in accordance with this protocol makes it possible to maintain replay compatibility with record/replay apparatuses, printing devices, personal computers, peripheral devices, and the like which understand the DCF protocol.

The print directory is recorded in accordance with a digital print order format (to be referred to as a DPOF hereinafter) protocol. A print list file is recorded as "AUTPRINT.MRK" under directory name "MISC". Conforming to the DPOF protocol allows a printing device or the like which understands DPOF to perform printing in accordance with the contents of the print list file. A print list file is a file obtained by recording contents, of the recorded contents, which are desired to be printed/displayed as a list file.

Currently, contents which can be handled by devices such as digital cameras and digital video cameras which record/replay data on/from memory recording media include still images, sounds, still images with sounds, and consecutive still images with a limited pixel size and limited frame rate. Recently, increasing the capacity and speed of a memory storage medium, decreasing its cost, and improving the performance of a device have been creating an environment in which as contents which can be recorded/replayed, data with a TV size or more, low-rate data, and data with a full rate of 60 frames/sec as well as consecutive still images with limitations can be handled. That is, high-resolution moving images can be recorded/replayed on/from a memory storage medium. In addition, moving images and still images can be recorded on the same recording medium.

Furthermore, as the performance of a printing device improves and the print cost decreases, recorded contents are printed more frequently. In the future, with the popularization of devices which record moving image contents on memory recording media, it is expected that one scene of a moving image will be printed in more occasions (Japanese Patent Laid-Open No. 2002-94904).

In current digital image capturing devices, however, there is no unified sequence (protocol) for recording moving images and still images on one memory storage medium, and hence no compatibility is ensured among device makers. In addition, peripheral devices such as a replay device which replays recorded contents, a display device such as a monitor, a printing device which prints out contents, and a personal computer which performs dubbing or network distribution cannot understand the recording protocol for memory storage media. Therefore, a dedicated device and application program are required. In addition, there is no unified sequence (protocol) for automatically printing a scene (cut) of a moving image. In the future, although the above standards may be unified, it takes a certain period of time to popularize and stabilize the standards. Furthermore, it is necessary to maintain compatibility among digital cameras, digital video cameras, and peripheral devices conforming to conventional standards.

It is an object of the present invention to provide new functions for moving image record/replay and printing functions while maintaining the compatibility between the record/replay standards and print list standards of conventional digital image capturing devices.

SUMMARY OF THE INVENTION

In order to solve the above problems and achieve the above object, there is provided a record/replay apparatus comprising file management means having a moving image directory and a still image directory, print file producing means for producing a still image file under the still image directory as a print list, and still image extraction means for extracting a still image of a designated scene from a moving image file under the moving image directory, wherein when print designation is performed with respect to the still image of the designated scene from the moving image, the still image extracted by the still image extraction means is recorded under the still image directory, and the still image is registered in a print list by the print file producing means.

According to the present invention, there is provided a record/replay method for an apparatus including file management means having a moving image directory and a still image directory, print file producing means for producing a still image file under the still image directory as a print list, and still image extraction means for extracting a still image of a designated scene from a moving image file under the moving image directory, comprising when print designation is performed with respect to the still image of the designated scene from the moving image, recording the still image extracted by the still image extraction means under the still image directory, and registering the still image in a print list by the print file producing means.

With this arrangement, a print list file in which scenes (cuts) in a moving image produced by this apparatus are listed can maintain proper compatibility with respect to an apparatus which records/replays only still image information and has an automatic printing function.

In the above apparatus or method, the file management means further comprises a management file which manages files under the moving image directory and still image directory, and when print designation is performed with respect to the still image of the designated scene from the moving image, the still image extracted by the still image extraction means is recorded under the still image directory, the still image is registered in a print list by the print file reproducing means, and the still image is registered as a moving image index in a management file. With this arrangement, there can be provided a new function which can maintain proper compatibility with respect to an apparatus which records/replays only still image information and has an automatic printing function, and can automatically register a representative image of a moving image.

In the above apparatus or method, the moving image index is registered in a management file, and at the same time, at least one of pieces of additional information including print designation, a print execution history, a designated still image position, a style or layout, and a print count is registered. This makes it possible to hold useful information such as print designation information and a print history.

In addition, according to the present invention, there is provided a record/replay apparatus comprising file management means having a moving image directory and a still image directory, print file producing means for producing a plurality of still image files under the still image directory as a multi-index print list, and first still image extraction means for extracting a plurality of still images of designated scenes from a plurality of moving image files under the moving image directory, wherein the plurality of still images extracted by the still image extraction means are recorded under the still image directory, and the plurality of still images are registered in a multi-index print list by the print file producing means.

Furthermore, according to the present invention, there is provided a record/replay method for an apparatus including file management means having a moving image directory and a still image directory, print file producing means for producing a plurality of still image files under the still image directory as a multi-index print list, and first still image extraction means for extracting a plurality of still images of designated scenes from a plurality of moving image files under the moving image directory, comprising recording the plurality of still images extracted by the still image extraction means under the still image directory, and registering the plurality of still images in a multi-index print list by the print file producing means.

With this arrangement, proper compatibility can be maintained with respect to an apparatus which records/replays only still image information and has an automatic printing function, and the respective moving image contents in a recording medium can be produced as a multi-index print list.

In the above apparatus or method, there is further provided second still image extraction means for extracting still images of a plurality of designated scenes from a moving image file under the moving image directory. With this arrangement, proper compatibility can be maintained with respect to an apparatus which records/replays only still image information and has an automatic printing function, and the respective moving image contents in a recording medium can be produced as a multi-index print list.

In the above apparatus or method, the plurality of designated scenes are designated by any one of sets of scenes of a moving image at predetermined intervals, scenes designated by a user, and scenes at image or sound change points. This makes it possible to produce a print list file as optimal representative image indexes of a moving image file.

In the above apparatus or method, the print file is in a format conforming to a digital print order format standard. This makes it possible to maintain proper compatibility with peripheral devices using the conventional DPOF standard.

In the above apparatus or method, there is further provided display means for replaying/displaying images of the print list in the form of thumbnails, the display means displaying the extracted still image in correspondence with the original moving image file. This makes it possible to recognize the correspondence between the still images extracted from a moving image file and the original moving image.

According to the present invention, there is provided a record/replay apparatus which manages still images with a predetermined directory, comprising replay means for replaying a moving image recorded on a recording medium, storage means for extracting a still image from the moving image replayed by the replay means, and additionally recording the still image in the predetermined directory of the recording medium, and display control means for displaying still images and moving images recorded on the recording medium on a display device in the form of a list, the display control means setting a display position of a still image extracted from the moving image at a position adjacent to the original moving image.

Moreover, according to the present invention, there is provided a record/replay method for an apparatus which includes replay means for replaying a moving image recorded on a recording medium, and storage means for extracting a still image from the moving image replayed by the replay means, and additionally recording the still image in the predetermined directory of the recording medium, and manages still images with a predetermined directory, comprising a display control step of displaying still images and moving images recorded on the recording medium on a display device in the form of a list, wherein in the display control step, a display position of a still image extracted from the moving image is set at a position adjacent to the original moving image.

With this arrangement, since a still image extracted from a moving image is displayed near the original moving image, the image can be displayed so as to make it easy to know from which moving image the still image has been extracted.

In the above apparatus or method, the display control means or step displays still images, of still images recorded on the recording medium, which exclude still images extracted from a moving image, upon arranging the still images in a predetermined order, and displays the still images extracted from the moving image upon arranging the still images in a display order different from the predetermined order. A still image extracted from a moving image is displayed near the original moving image to make it easy to know the relationship between the still image and the original moving image, thereby improving operability.

According to the present invention, the above record/replay method can be applied as a program to be executed by a computer, a recording medium storing the program, and the like.

As described above, according to the first aspect of the present invention (according to claims 1 and 13), moving image contents can be handled while proper compatibility is maintained with respect to a conventional apparatus which has a function of recording/replaying only still image information and an automatic printing function.

According to the second aspect of the present invention (according to claim 2), a new function exhibiting high convenience, which is not available in the prior art, can be provided.

According to the third aspect of the present invention (according to claim 3), useful information such as print designation information and a print history can be held and displayed.

According to the fourth aspects of the invention (according to claims 4 and 14), there can be provided a very useful function that can hold compatibility with conventional digital cameras and peripheral devices and produce a print file of moving image contents in a multi-index form.

According to the fifth aspect of the present invention (according to claim 5), there can be provided a very useful function that can hold compatibility with conventional devices and produce a representative image of each moving image file as a print file in a multi-index form.

According to the sixth aspect of the present invention (according to claim 6), a more representative index image can be selected from a moving image file.

According to the seventh aspect of the present invention (according to claims 7 and 9), proper compatibility with peripheral devices using the conventional DPOF standard can be maintained.

According to the eighth aspect of the present invention (according to claims 8 and 10), the correspondence between a still image extracted from a moving image file and the original moving image can be recognized.

According to the ninth aspect of the present invention (according to claims 11 and 15), since a still image extracted from a moving image is displayed near the original moving image, the original moving image can be displayed so as to be easily understood.

According to the tenth aspect of the present invention (according to claim 12), an extracted image and an original image can be displayed such that their relationship can be easily known, thereby improving operability.

Note that the same effects as those described above can be obtained even by applying the present invention to a program for causing a computer to execute the record/replay method of the present invention, a recording medium storing the program, and the like.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a view for explaining an example of management data in the first embodiment according to the present invention;

FIG. 5 is a view for explaining an example of management data in the first embodiment according to the present invention;

FIG. 6 is a view for explaining an example of management data in the first embodiment according to the present invention;

FIG. 10 is a view showing an example of the directory arrangement of the second embodiment of the present invention;

FIG. 11 is a view for explaining how still images are captured from a moving image file;

DETAILED DESCRIPTION OF THE PREFERRED EMBODIMENTS

The embodiments of the present invention will be described in detail under with reference to the accompanying drawings.

Note that each embodiment described under is an example of a means for implementing the present invention. The forms exemplified under should be corrected or changed as needed in accordance with the arrangements of apparatuses to which the present invention is applied and various conditions. The present invention is not limited to the embodiments described under.

Obviously, the object of the present invention is realized even by supplying a storage medium (or a recording medium) storing software program codes for realizing the functions of the embodiments to be described under to a system or apparatus, and causing the computer (or a CPU or MPU) of the system or apparatus to read out and execute the program codes stored in the storage medium.

First Embodiment

Figure 1:
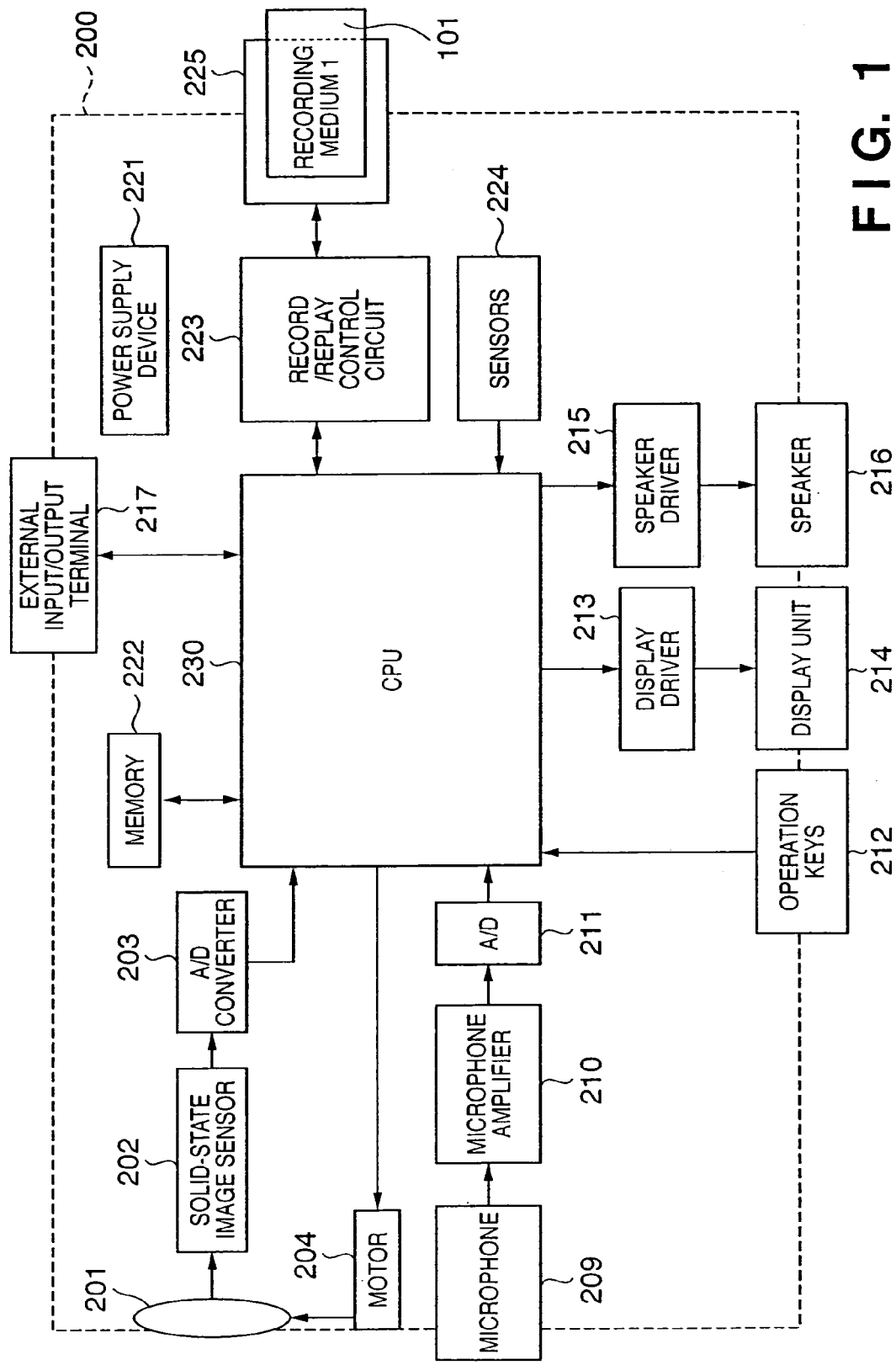
FIG. 1 is a block diagram of the first embodiment according to the present invention.

FIG. 1 is a functional block diagram of an embodiment in which the present invention is applied to an image capturing apparatus such as a digital camera.

In an image capturing apparatus 200 shown in FIG. 1, reference numeral 201 denotes a lens which captures a picture; 202, a solid-state image sensor such as a CCD which photoelectrically converts a picture into an electrical signal; 204, a motor which drives the lens 201; 209, a microphone which captures a sound; 210, a microphone amplifier which amplifies a sound; 211, an A/D converter which converts a sound into digital data; 212, operation keys which are used to operate the image capturing apparatus 200; 213, a display driver which converts a picture into a display format; 214, a display unit such as an LCD or EVF for displaying a picture; 215, a speaker driver for outputting a sound; 216, a speaker; 217, an input/output terminal which inputs/outputs various kinds of information; 223, a record/replay control circuit; 224, various kinds of sensors; 101, a storage medium; 225, a socket which accommodates the storage medium 101; 230, a CPU which controls the system; 222, a memory for the CPU 230 and system; and 221, a power supply device for the image capturing apparatus.

The basic recording operation of the image capturing apparatus will be described first with reference to FIG. 1.

Light received from an object through the lens 201 is converted into an electrical signal by the solid-state image sensor 202. This signal is sampled and converted into digital data by the A/D converter 203. This digital data is input as a digital picture signal to the CPU 230. With an autofocus function and zoom function, the lens 201 is moved by driving the motor 204 in accordance with a control instruction from the CPU 230. The CPU 230 generates a timing signal for reading data from the solid-state image sensor. The sound signal obtained by the microphone 209 is amplified by the microphone amplifier 210. The amplified signal is sampled and converted into digital data by the A/D converter 211. The digital data is input to the CPU 230. The CPU 230 performs basic processing such as color separation, white balance adjustment, gamma correction; and aperture correction for the digital picture signal, and performs additional processing such as image size adjustment, image quality adjustment, and position adjustment which are set with the operation keys 212 of the image capturing apparatus 200 with respect to the signal. The signal is further subjected to image compression processing such as MPEG, MJPEG, JPEG, or JPEG2000 by a set compression method using a compression parameter, thereby obtaining compressed image data. The sound data is subjected to additional processing such as sound quality adjustment which is set with the operation keys 212 of the image capturing apparatus 200, and compressed sound data is obtained by performing a set compression method using a compression parameter with respect to the sound data. The compressed image data and compressed sound data are sent as recorded data to the record/replay apparatus control circuit 223, together with control data. The above control data means information of the image capturing apparatus itself, record setting information for the image and sound, additional image capturing information such as an image capturing history and image capturing environment information, medium information of a recording medium to be used, and the like.

At the time of recording operation, the record/replay apparatus control circuit 223 writes the above recorded data as a file in the recording medium 101 under the control of a file system such as UDF, FAT, or EXT2. The file system means a structural system comprising management information for file management and file data. Making this file system into a common system makes it possible to record/replay information on/from different storage media or different record/replay devices. The above recorded data is sent to the external input/output terminal 217 as needed. The recorded data is also displayed for a check on the display unit 214 through the display driver 213. The power supply device 221 in the image capturing apparatus 200 supplies power to the respective circuit blocks.

As the recording medium 101, one of the following can be used: memory cards such as an MMC, an SSFDC, a compact flash, an SD, and a PC card, and magnetic (or magnetooptic) recording media such as a hard disk, a CD-RW, an FD, an MD, and a DVD-RAM, and the like. Such a recording medium is connected to the socket 225, and can be detached/attached by a user. Making the shape of the socket correspond to a plurality of types of recording media allows the use of a plurality of types of recording media.

In the case of still image recording, in the process of starting recording operation and finishing the recording operation with image capturing start and end switches in the operation keys 212 of the image capturing apparatus 200, a still image is JPEG-compressed, and a file is produced in conformity with the DCF protocol and stored in the recording medium 101. In the case of moving image recording, a moving image and sound are MPEG-compressed, and a file is produced in conformity with a moving image recording protocol (no standard specifications have been currently set) and sequentially recorded as one scene.

Basic replay operation (for a single file) will be described next with reference to FIG. 1.

When a file selected by the user from the files recorded on the recording medium 101 or 102 is to be replayed, a designated file is read in from the recording medium 101 inserted in the socket 225 under the control of the record/replay apparatus control circuit 223. A designation method is performed as follows. A list of image files in the recording medium 101 is displayed. The user then selects/designates a desired file by using the operation keys 212. The read-in data is sent to the CPU 230, which in turn performs analysis and separation of the read-in data to decompose the data into an image data portion, sound data portion, information data portion, and the like. The image data portion is decompressed, if it is compressed data, and displayed on the display unit 214 through the display driver 213. The sound data portion is decompressed, if it is compressed data, and sent to the speaker 216 through the speaker driver 215. Depending on information data contents, processing such as effect processing and retouching is performed for the image data and sound data. In addition, the data is displayed on the display unit 214 as needed. The above image data, sound data, and information data are also sent to the external input/output terminal 217.

A print file producing sequence will be described next.

When the image capturing apparatus 200 is set in the print file setting mode, files recorded on the recording medium 101 are read in under the control of the record/replay apparatus control circuit 223, and are displayed on the display unit 214 through the display driver 213 under the control of the CPU 230. The display form includes a scheme of displaying a file name list or a scheme of performing index display of reduced images of recorded images. The user designates a desired file with the operation keys 212. In addition, the user can input a print count, a print style, an image processing method, and additional print information (text information, recorded information, and the like). When this operation is performed a plurality of numbers of times, and print file production is executed at the end of designation, a print file is produced in conformity with a print file protocol (e.g., the DPOF protocol) under the control of the CPU 230, and is recorded as a print file on the recording medium 101 under the control of the record/replay apparatus control circuit 223.

Figure 2:
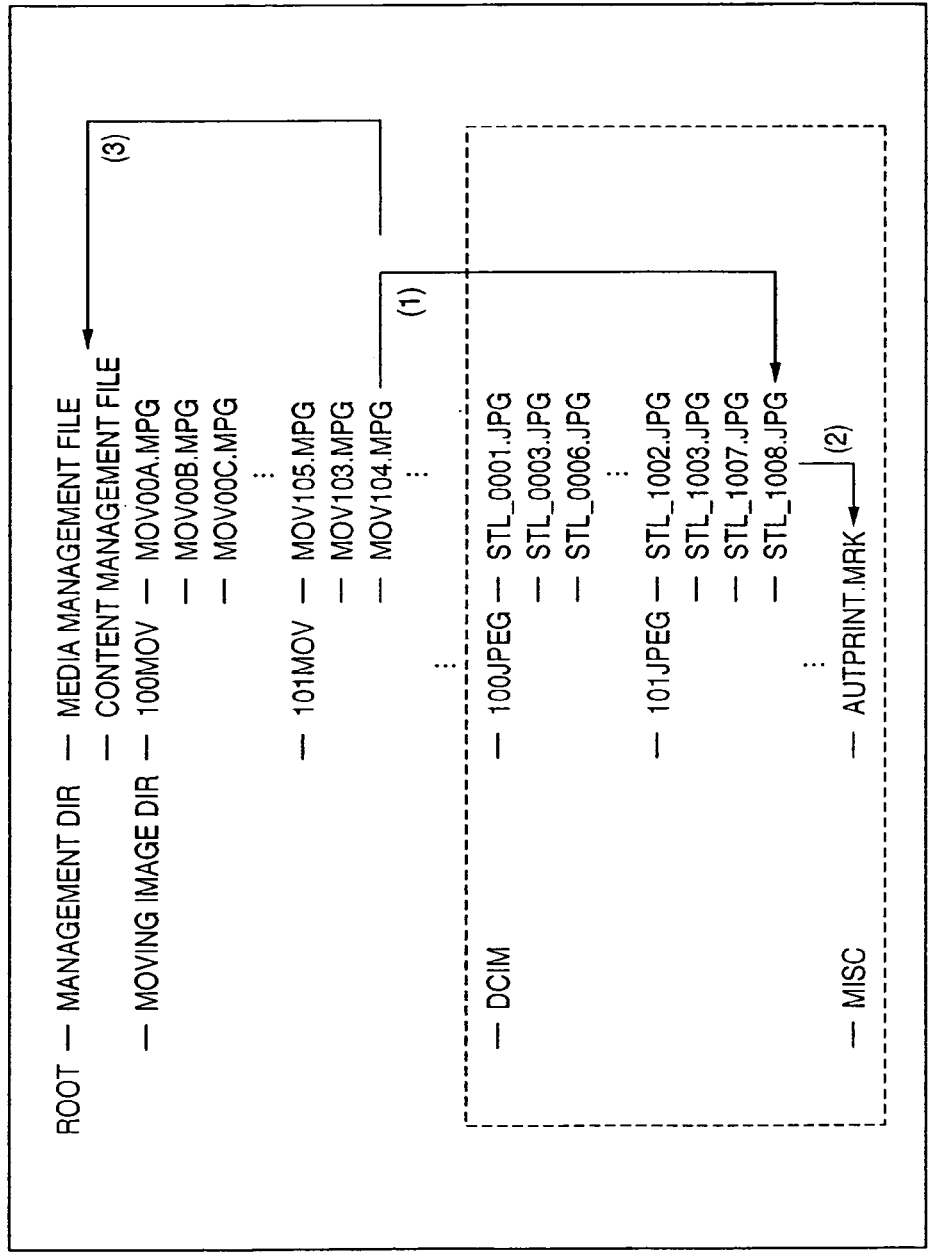
FIG. 2 is a view showing an example of the directory arrangement of the first embodiment according to the present invention.

FIG. 2 shows an example of directories recorded on the recording medium 101 and a file producing sequence in this embodiment. Under the root directory, still image directory "DCIM", moving image directory "moving image DIR", print directory "MISC", and management directory "management DIR" exist in conformity with a given protocol. In this case, the still image directory is recorded according to the DCF protocol. Under directory "DCIM", subdirectories "100JPEG" and "101JPEG" exist. Under these subdirectories, there are recorded still image files with file names "STL_0001.JPG", "STL_0003.JPG", . . . , "STL_1002.JPG", "STL_1003.JPG", . . . . Under moving image directory "moving image DIR", subdirectories "100MOV" and "101MOV" exist. Under these subdirectories, there are recorded moving image files "MOV00A.MPG", "STL_100B.MPG", . . . , "MOV105.MPG", "MOV103.MPG", . . . . Since no standard protocol concerning moving image files has been proliferated, this embodiment exemplifies an example. A print directory is recorded according to the DPOF protocol. Under directory "MISC", a print list file is recorded as "AUTPRINT.MRK". According to the DPOF protocol which has currently proliferated in digital cameras and electronic labs, still image files under directory "DCIM" are generally registered in a print list file. Management directory "management DIR" records data file "media management data file" for managing the recording medium 101 itself and data file "content management file" for managing recorded content files. The contents recorded in "media management data file" include inherent physical medium information such as a medium number, manufacturer name, place of production, medium format, medium capacity, and medium characteristics, medium logical information such as a format type and capacity usage, various kinds of time information such as a production time, shipment time, medium format time, medium rewrite time, and medium access time, and information such as an owner, copyright, and title.

A sequence according to this embodiment in the apparatus comprising directories like those described above will be described next. Assume that moving image file "MOV104.MPG" is being replayed, or a moving image file and replay position are designated, and a print file production instruction is issued. In this case, (1) a still image is captured from the moving image during replay or a still image at a designated position is captured to produce a still image file. At this time, as attribute information of each still image file, information specifying the original moving image file is recorded. At the same time, (2) the above still image file is registered and produced in a print file. In addition, (3) the image information and additional information obtained by the above operation are registered in a management file. With this operation, the compatibility of directories "DCIM" and "DPOF" with conventional digital cameras and peripheral devices can be held. In addition, since the image information and additional information have been registered in the management file, when the contents recorded on the recording medium are to be displayed in an index form, the still image contents recorded in directory "DPOF" can be quickly displayed as print indexes of prints of moving image files (to be referred to as print index images or print indexes hereinafter). As a representative image candidate of a moving image file, an image arbitrarily designated by the user, an image at a distinctive sound or image change point, an image at a point detected by an apparatus sensor, or the like is conceivable. However, a function of automatically adding contents for which print settings are intentionally made by the user to representative images is a very effective means and function.

Figure 3A:
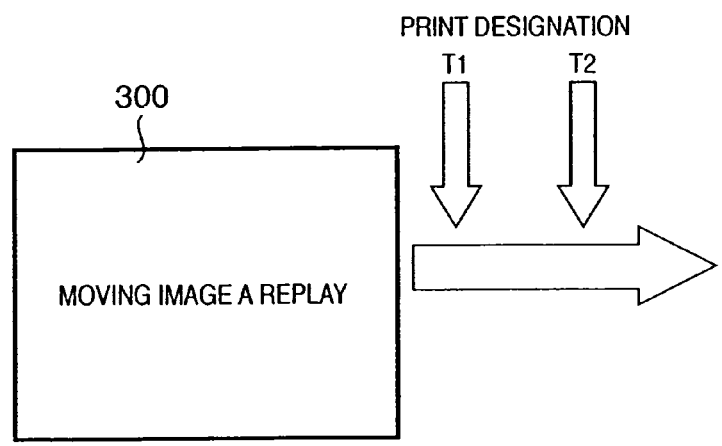
FIG. 3A is a view for explaining an example of the operation of the first embodiment according to the present invention.
Figure 3B:
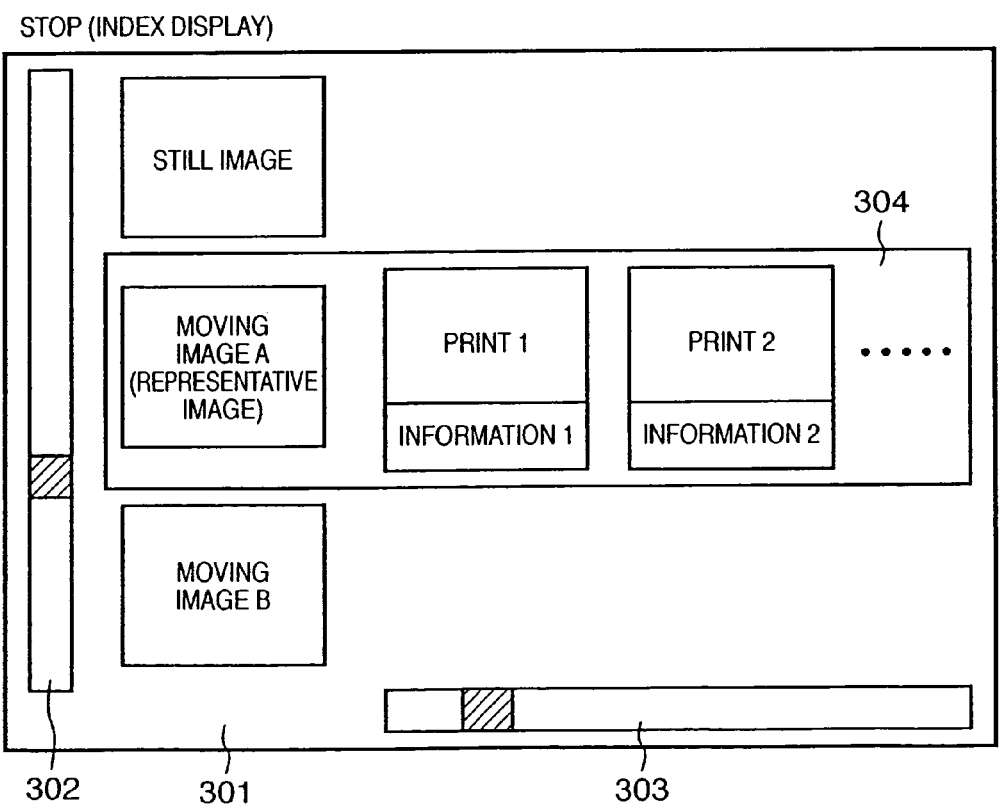
FIG. 3B is a view for explaining a display example of the first embodiment according to the present invention.

FIGS. 3A and 3B are views for explaining the operation of this embodiment and a display example.

Referring to FIG. 3A, reference numeral 300 denotes a display window. FIG. 3A shows how the user performs print designation at moving image replay time points T1 and T2 while a moving image A is replayed. A result of this operation, i.e., subsequent index display, will be described with reference to FIG. 3B. Reference numeral 301 denotes a display window; 302, a slide bar for selectively displaying a plurality of recorded contents; 303, a slide bar for selectively displaying a plurality of print indexes of the respective contents; and 304, group display of the respective contents. In this embodiment, three contents are displayed by using the slide bar 302. The contents of the group display 304 are moving image contents. First of all, the start moving image is displayed as a representative image. In addition, "print 1" and "print 2" respectively indicate print indexes at operation time points T1 and T2, and " . . . " indicates that other print indexes exist. Two print indexes and pieces of corresponding information are selectively displayed by using the slide bar 303. Information displayed in group display 304 may include representative indexes of moving images, the titles of contents, and content additional information such as copyright information which are produced separately, as well as the print indexes.

Assume that still images or moving images recorded on a recording medium are to be displayed side by side (index display). In this case, if the still images are extracted from moving images, displaying each still image adjacent to a reduced image of the corresponding original moving image makes it possible to easily comprehend a time relationship in the index display, thereby providing convenience.

A still image extracted from a moving image in this embodiment is assigned a file name and file number and additionally recorded at the extraction stage. For this reason, a file name and file number after a still image captured after a moving image are assigned.

If images are displayed in an index form in the order of file names or numbers assigned to files as in a normal case, still images extracted from a moving image as in this embodiment are arranged after still images captured after the moving image. This makes it difficult to comprehend the time relationship between these images, resulting in poor operability.

In this embodiment, therefore, in index display, still images extracted from a given moving image are arranged and displayed near the original moving image by using information in the management directory or the information of the original moving image which is contained in the attribute information of each still image, thereby displaying the images so as to make it easy to know from which moving image each still image has been extracted.

In other words, of the still images recorded on a recording medium, still images except for the still images extracted from moving images are arranged and displayed in a predetermined order, while the still images extracted from the moving images are displayed in a display order different from the predetermined order. This display order may be a file name order, file number order, or record time order.

With regard to a display form to be used at this time, reduced images (thumbnail images) of the respective images are displayed such that each moving image and still images which are extracted therefrom are arranged within the same frame, or on the same row, or assigned identical symbols.

The reduced image of an extracted still image may be located vertically adjacent to a reduced image representing the original moving image instead of being located horizontally adjacent to it.

As shown in FIG. 3B in this embodiment, the respective reduced images of still and moving images are arranged in a column so as to be scrolled and displayed. Arranging still images extracted from a given moving image in a direction perpendicular to the above column is a display form that makes it very easy to know the corresponding original moving image.

The above embodiment has exemplified the case wherein images to be printed are extracted as still images. However, the present invention is not limited to this purpose, i.e., printing, and can be applied to a case wherein still images to be replayed are extracted from a moving image.

FIGS. 4 to 6 show an example of the management data of a "content management file".

Referring to FIG. 4, the names, contents, and byte counts of data, which are a characteristic feature of the present invention, are written. First of all, "NumFile" is 4-byte information representing the total number of recorded content files. "Offset" is 4-byte information representing an offset value to next data "FileInfo [NumFile]". "FileInfo [NumFile]" represents file information of each content file and comprises (32×total file count) bytes. Since file information has a variable length, the above offset exists to make it easy to acquire subsequent data. After the file information, "other management data" such as navigation information and play list information follow. FIG. 5 shows the details of "FileInfo" in FIG. 4. First of all, "FileID" is 2-byte information representing the ID of a content file. "NumPrintIndex" is 1-byte information representing the total number of print indexes which this FileID has. This embodiment can have a maximum of five print indexes. Each of "PrintIndexInfo0" to "PrintIndexInfo4" is 5-byte additional information concerning a corresponding one of the print indexes. After index information 4, "other pieces of file information" such as a protect flag, hidden file flag, and time management information, e.g., production and update, follow.

FIG. 6 shows the details of "PrintIndexInfoN" in FIG. 5. First of all, "IsPrintIndex" is a 1-bit flag representing whether any print index exists. "OffsetTime" is 5-bit information representing the position of a scene captured from a moving image content relative to the start of the moving image. "IsDPOF" is a 1-bit flag representing whether the data conforms to the DPOF standard. "IsPrinted" is a 1-bit flag representing whether the data is an image actually having a print history. "NumPrint" is 4-bit information representing the number of prints registered in the print list. "PrintStyle" is 4-bit information representing a print style (format and printing method) registered in the print list. "PrintPos" is 8-bit information representing a print position registered in the print list. After the print position, "other pieces of print information" such as a person who is to print out, print owner, copyright owner, and time management information, e.g., production and update, follow. In this embodiment, each print index is represented by an offset of a corresponding file ID. However, the entity of each index file may be recorded.

Figure 7A:
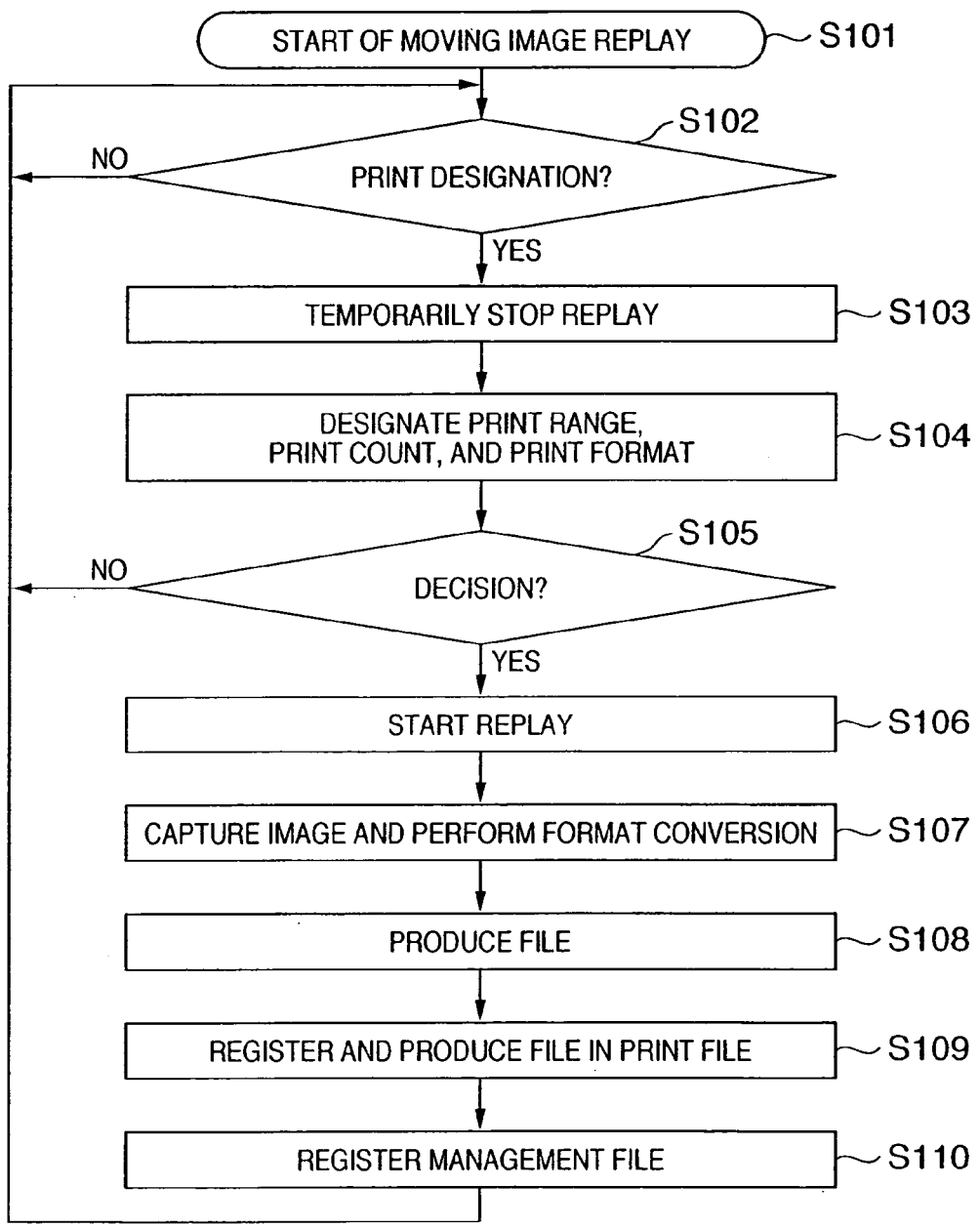
FIG. 7A is a flowchart for explaining a task for the replay of a moving image in the first embodiment according to the present invention.

FIG. 7A is a flowchart for explaining a task in this embodiment. In step S101, the replay of a moving image content selected/designated by the user is started. In step S102, it is evaluated whether print designation is made. If NO in step S102, polling is performed. If YES in step S102, replay operation is temporarily stopped in step S103. In step S104, a print designation menu is displayed to prompt the user to perform input operation for designation. The user then inputs a designated print range, print count, print format, and the like. In step S105, it is evaluated whether the user makes decision. If the user makes cancellation, the flow returns to step S102. If the user makes decision, the flow advances to step S106 to start replay operation. While the replay operation is continued, an image is captured on the basis of the information designated in step S104, and the image format is converted as needed. In step S108, a file is produced in conformity with the DCF protocol. At the same time, in step S109, a print file is produced in conformity with the DPOF protocol, and the print file is updated. The pieces of information obtained in steps S104 to S109 are registered in the management file in step S110 to update the management file. The flow then returns to step S102 to maintain the task.

Figure 7B:
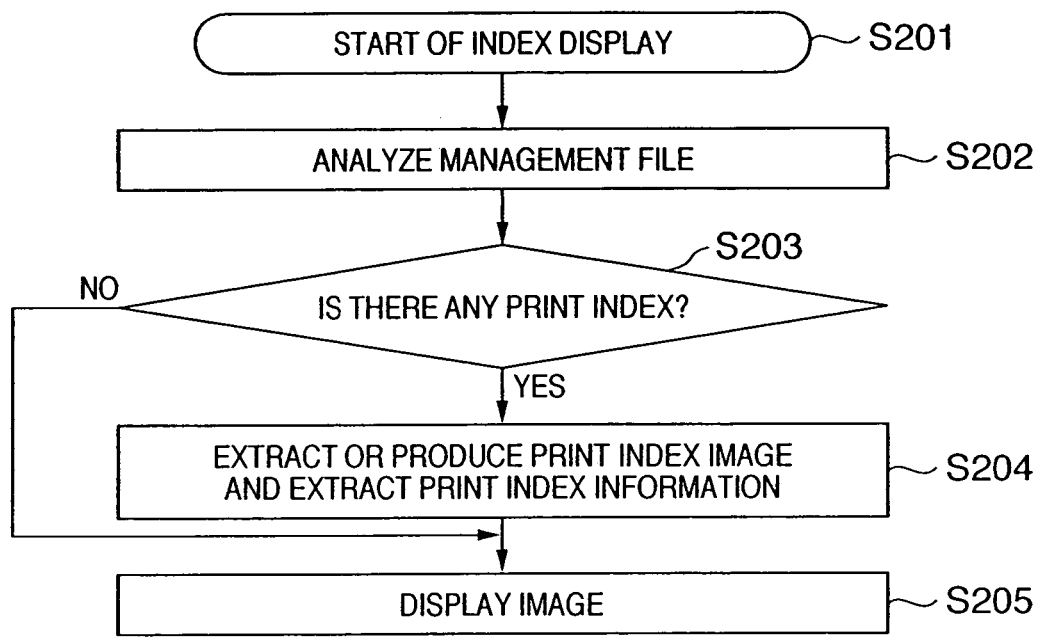
FIG. 7B is a flowchart for explaining a task for index display in the first embodiment according to the present invention.

FIG. 7B is a flowchart for explaining a task for index display. In step S201, index display is started. In step S202, a management file recorded on a storage medium or cached in the apparatus body is read in and analyzed. In step S203, it is evaluated whether information associated with a print index of each file exists in the management file. If NO in step S203, general index display is performed in step S205. If information associated with a print index exists, the associated information is analyzed to extract print index images, perform image conversion for display, and extract print index information in step S204. In step S205, index display of the images and information associated with the print index is performed in addition to general index display. The processing is then terminated.

With the above operation, even in a recording medium containing a moving image directory and moving image contents, since the compatibility between conventional directories "DCIM" and "DPOF" and conventional directories is maintained, proper compatibility can be maintained in existing digital cameras and peripheral devices such as printing devices. In addition, the function of automatically adding contents, as representative image candidates of moving image files, for which print settings are intentionally made by the user, to representative images can provide a very effective means and function.

Second Embodiment

The second embodiment includes a function of producing moving image contents in a printing medium as a print list of multi-indexes, and a function of producing moving image file contents in a recording medium as a print list of multi-indexes.

The second embodiment also comprises the blocks in FIG. 1, and performs basic record/replay operation in the same manner as in the first embodiment.

Figure 8:
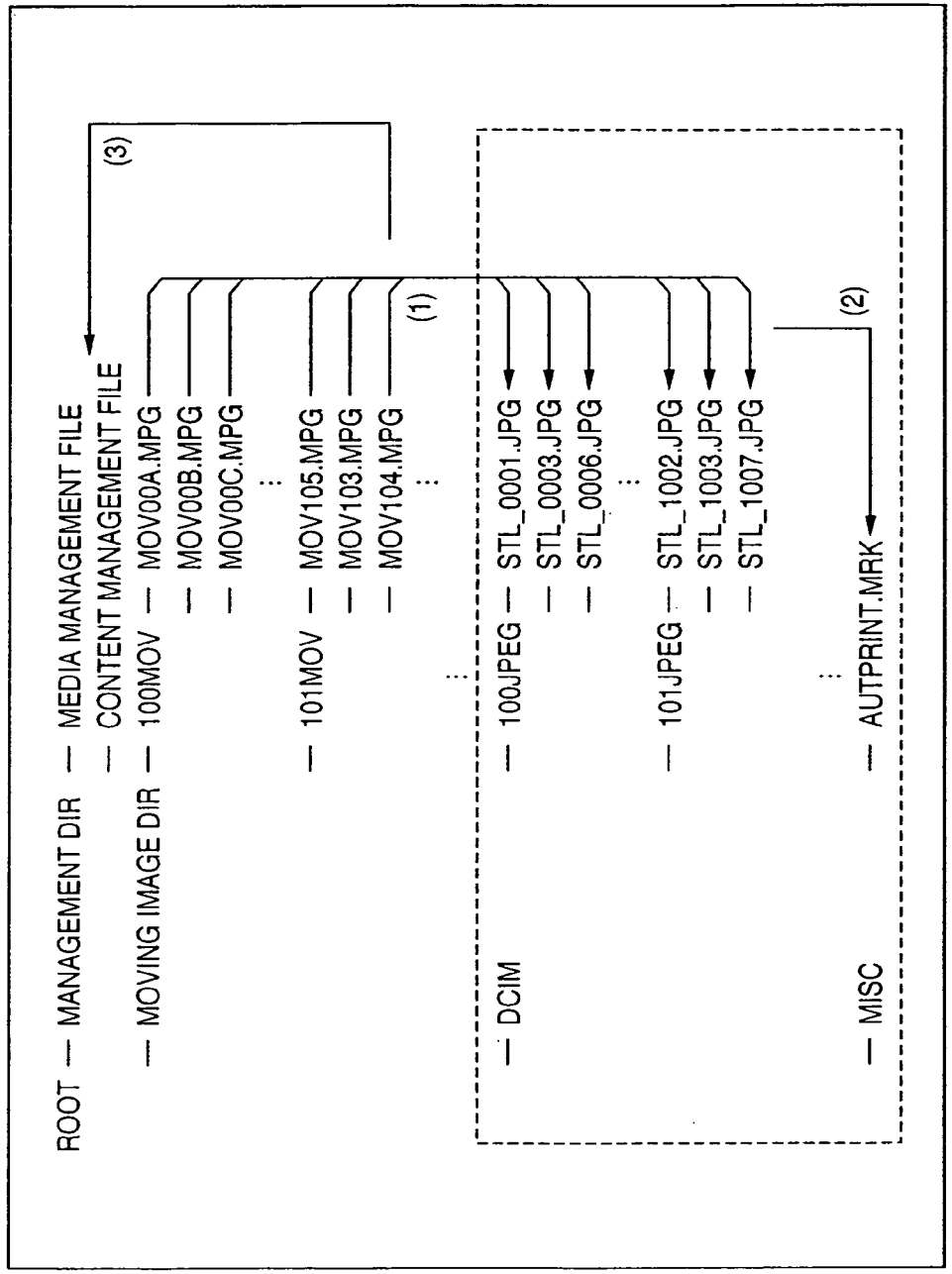
FIG. 8 is a view for explaining an example of the directory arrangement of files recorded on a recording medium and a file producing sequence in the first embodiment according to the present invention.
Figure 9:
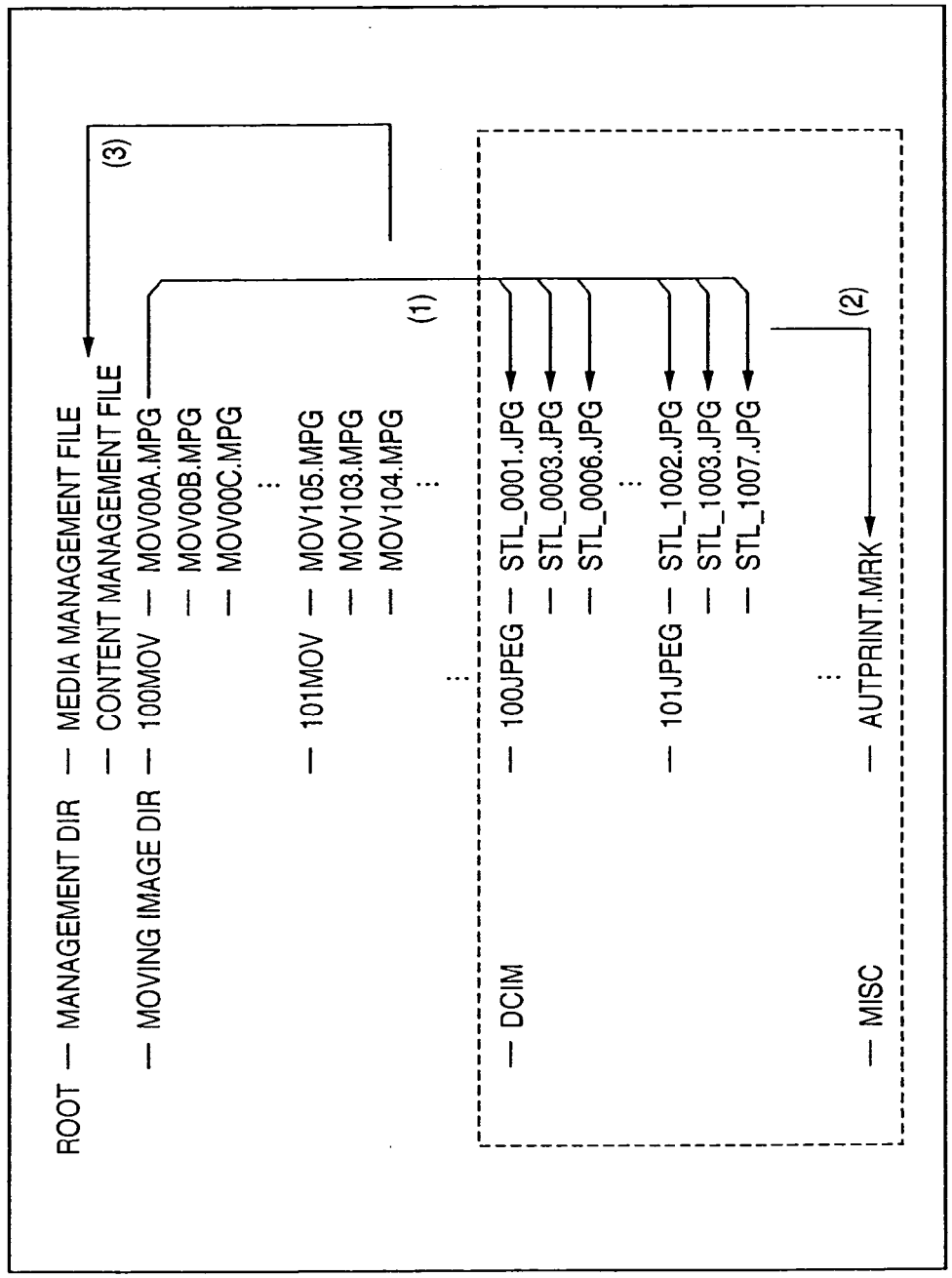
FIG. 9 is a view for explaining an example of the directory arrangement of files recorded on a recording medium and a file producing sequence in the first embodiment according to the present invention.

Each of FIGS. 8 and 9 shows an example of directories of files recorded on a recording medium 101 and a file producing sequence in this embodiment. Under the root directory, still image directory "DCIM", moving image directory "moving image DIR", print directory "MISC", and management directory "management DIR" exist in accordance with a given protocol. Each directory is the same as that described in the first embodiment.

According to the sequence for producing moving image contents in a recording medium as a print list of multi-indexes, if a plurality of moving image files, namely "100V/MOV00A.MPG", . . . , "101MOV/MOV104.MPG", exist blow the moving image directory as shown in FIG. 8, operation starts in response to a multi-print index instruction from a user or a specific mode such as a device stop mode or standby mode. (1) Designated still images are extracted from the respective moving images to produce still image files. A predetermined image can be selected by a method of selecting the start image of a moving image, an image after a lapse of a predetermined period of time, the last image, or an image at a change point of sound information, image information, or recorded information. At the same time, (2) the above plurality of still image files are formatted in a multi-index form to be produced and registered as a print file. Furthermore, (3) the image information and additional information obtained by the above operation are registered in a management file. This operation makes it possible to provide a useful function of holding compatibility between directories "DCIM" and "DPOF" and conventional digital cameras and peripheral devices and producing a print file of moving image contents in a multi-index form.

Figure 12B:
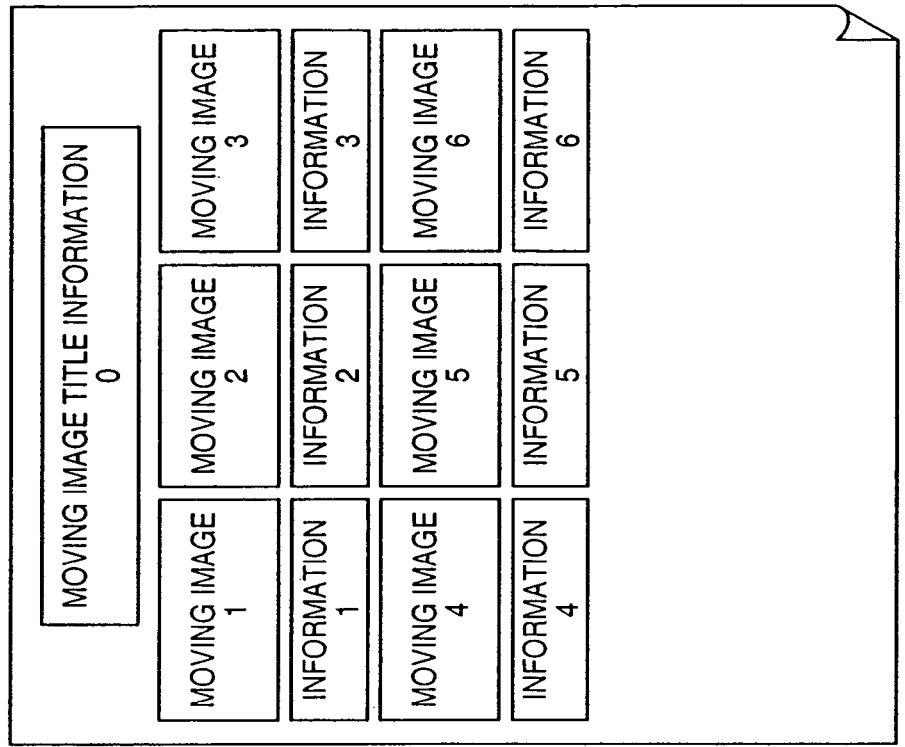
FIGS. 12A and 12B are conceptual views each showing how a print file is printed in a multi-index form by a printing device.
Figure 12A:
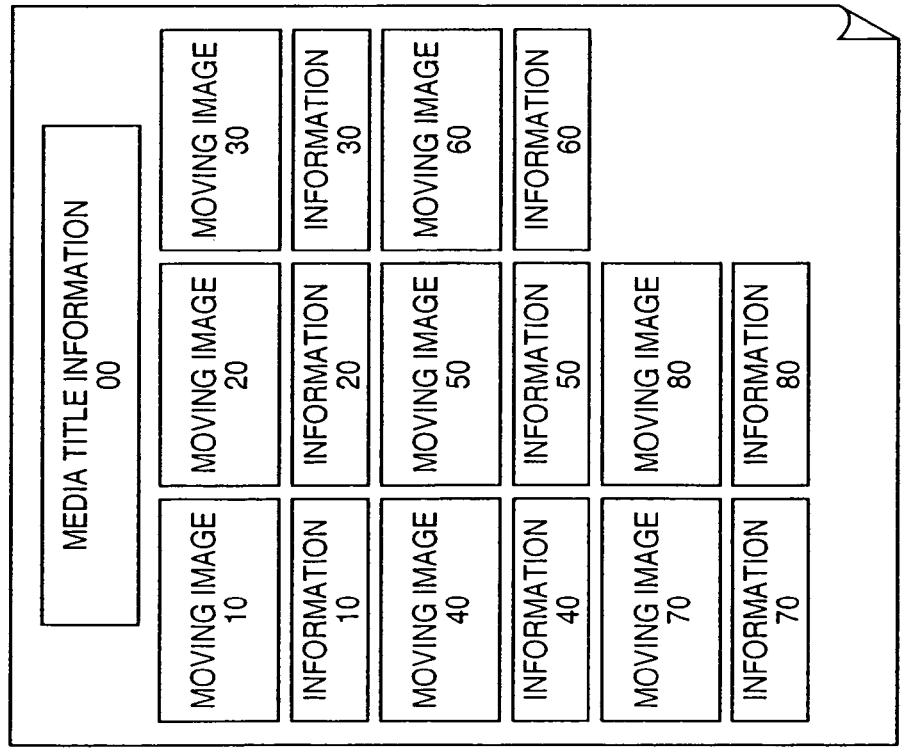

FIG. 10 is a view for explaining how still images are captured from moving image files. FIG. 12A is a conceptual view showing how a print file in a multi-index form is printed by a printing device.

Assume that moving image files 501 to 508 exist as shown in FIG. 10. In this case, start moving images 10 to 80 are captured as still images, and the still image files are formatted in a multi-index form to be produced as a print file. FIG. 12A is a conceptual view of this print file printed by the printing device. Assume that "media title" indicates the title of a recording medium, and accompanying information is represented by "information 00". A print list is produced so as to print still images "moving image 10" to "moving image 80" captured in the above manner, together with pieces of information "information 10" to "information 80" accompanying these images. Pieces of information "information 10" to "information 80" include moving image file names, replay time positions in the moving image files, record times, and titles of scenes, additional image information, additional sound information, and the like.

Referring to FIG. 9, the sequence for producing the moving image contents in a recording medium as a print list of multi-indexes is started in response to a multi-print index instruction from the user with respect to moving image file "100V/MOV10A.MPG" existing under the moving image directory or a specific mode such as a device stop mode or standby mode. (1) Designated still images are sequentially captured from designated moving images by a predetermined designation method to produce still image files. As the predetermined designation method, one of the following methods can be selected: designating images in accordance with user settings, designating images at predetermined intervals as a default, designating images at designated intervals set by the user as needed, and designating images automatically detected from image or sound change points. At the same time, (2) the above plurality of still image files are formatted in a multi-index form to be registered and produced in a print file. In addition, (3) image information and additional information obtained by the above operation are registered in a management file. This operation makes it possible to provide a useful function of holding compatibility between directories "DCIM" and "DPOF" and conventional digital cameras and peripheral devices and producing moving image files in the recording medium as a print file in a multi-index form.

FIG. 11 is a view for explaining how still images are captured from moving image files. FIG. 12B is a conceptual view showing how a print file in a multi-index form is printed by the printing device.

Referring to FIG. 11, reference numeral 400 denotes a moving image file stream, and one square represents one frame. In this case, six frames of moving images 1 to 6 are captured as still images, and the still image files are formatted in a multi-index form to be produced as a print file. FIG. 12B is a conceptual view showing how this print file is printed by the printing device. Assume that "moving image title" indicates the title of a moving image file, and accompanying information is represented by "information 0". A print list is produced so as to print still images "moving image 1" to "moving image 6" captured in the above manner, together with pieces of information "information 1" to "information 6" accompanying these images. Pieces of information "information 1" to "information 6" include replay time positions in the moving image files, record times, and titles of scenes, additional image information, additional sound information, and the like. This operation makes it possible to provide a useful function of holding compatibility between directories "DCIM" and "DPOF" and conventional digital cameras and peripheral devices and producing representative images of the respective moving image files as a print file in a multi-index form.

Figure 13:
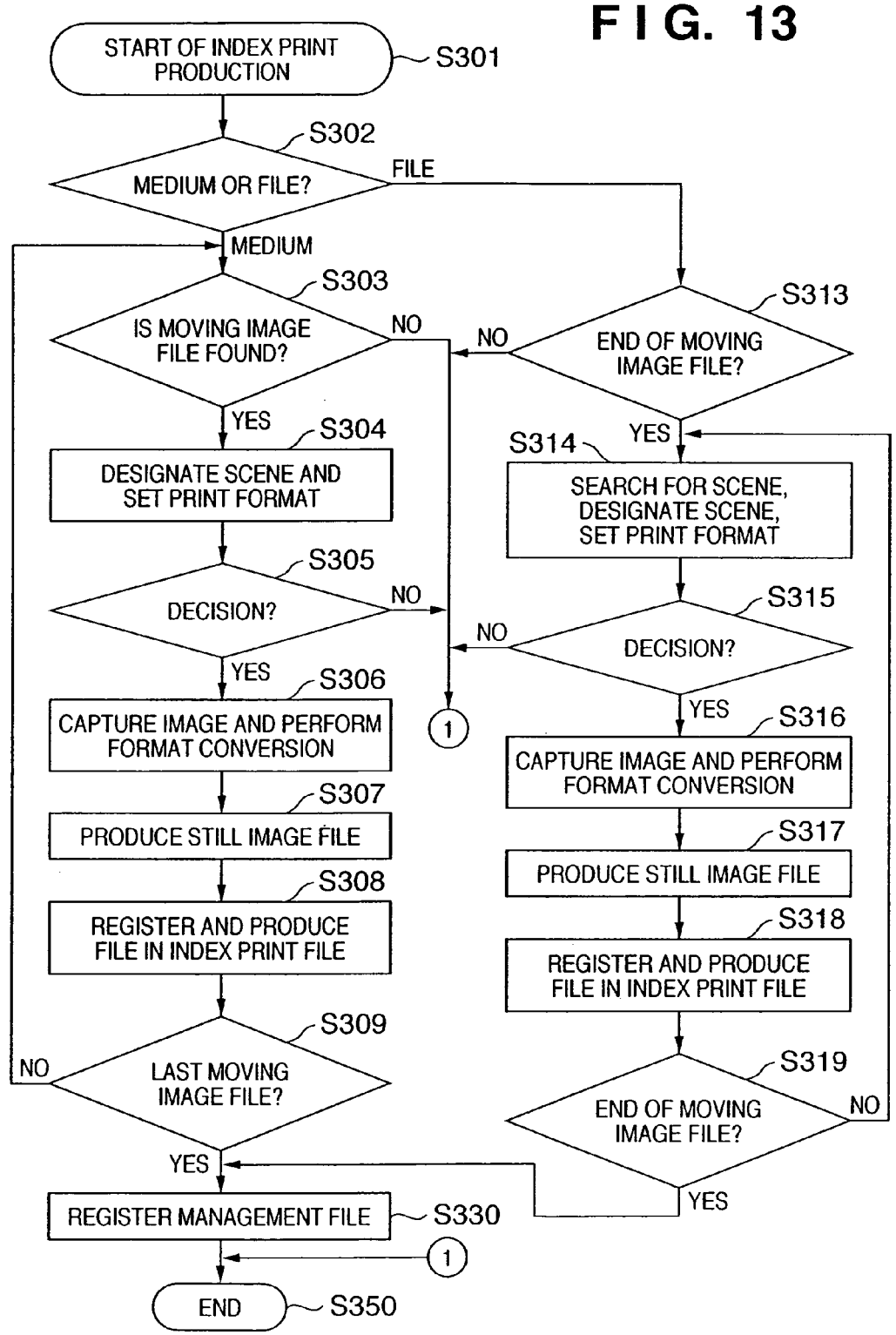
FIG. 13 is a flowchart for explaining a task in the second embodiment according to the present invention.

FIG. 13 is a flowchart for explaining a task in this embodiment. In step S301, index print production is started. In step S302, it is determined whether index print production is to be performed in a recording medium or moving image file. If this operation is to be performed in the recording medium, the flow advances to step S303 to search for a moving image file. If no moving image file exists, the processing is terminated in step S350. If a moving image file is found, still image are selected from the moving image file by a method of selecting the start image of the moving image, an image after a lapse of a predetermined period of time, the last image, or an image at a change point of sound information, image information, or recorded information, or the like. In addition, a print list format and the like are set. In step S305, it is checked whether the user makes decision (step S305 can be omitted). If the user makes cancellation, the processing is terminated in step S350. If the user makes decision, a still image is captured in step S306, and image format conversion and the like are performed as needed. In step S307, the still image files of the above still images are produced under the still image directory. In step S308, the produced files are registered in a print list in a multi-index form. In step S309, it is determined whether the moving image file search is complete. If the search is complete, the management file is updated with the pieces of information such as the above sequence and produced files in step S330. In step S340, a print list is produced as a print list file and written in the recording medium. If it is determined in step S309 that the moving image file search is not complete, the flow returns to step S303 to repeat the above operation. If it is determined in step S302 that processing is to be performed within the moving image file, the flow advances to step S313 to determine whether the current position is the moving image file end position. If YES in step S313, the processing is terminated in step S350. If NO in step S313, still images are selected from the moving image file by, for example, one of the following methods: designating images in accordance with user settings, designating images at predetermined intervals as a default, designating images at designated intervals set by the user as needed, and designating images automatically detected from image or sound change points. In addition, a print list format and the like are set. In step S315, it is checked whether the user makes decision (step S315 can be omitted). If the user makes cancellation, the processing is terminated in step S350. If the user makes decision, a still image is captured in step S316, and image format conversion and the like are performed as needed. In step S317, the still image files of the above still images are produced under the still image directory. In step S318, the produced files are registered in a print list in a multi-index form. In step S319, it is determined whether the end of the moving image file is reached. If YES in step S319, the management file is updated with the pieces of information such as the above sequence and produced files in step S330. In step S340, a print list is produced as a print list file and written in the recording medium. If it is determined in step S319 that the file end is not reached, the flow returns to step S314 to repeat the above operation.

With the above operation, even in a recording medium containing a moving image directory and moving image contents, since the compatibility between conventional directories "DCIM" and "DPOF" and conventional directories is maintained, proper compatibility can be maintained in existing digital cameras and peripheral devices such as printing devices. In addition, this operation can provide a very useful function of producing a list of moving image files existing in a recording medium or representative images of the respective moving image files can be produced as a print file in a multi-index form.

[Modification]

Figure 14:
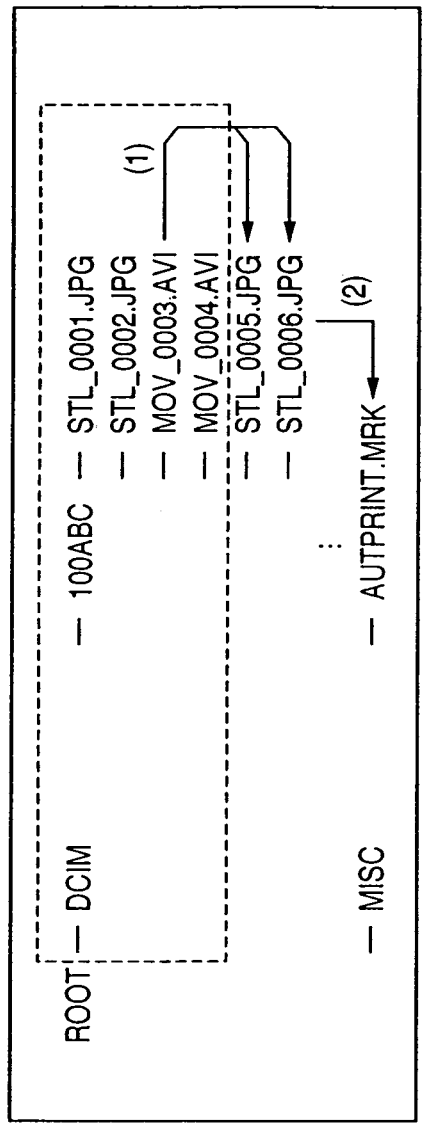
FIG. 14 is a view showing an example of the directory arrangement of files recorded on a recording medium and a file producing sequence in a modification of this embodiment.
Figure 15:
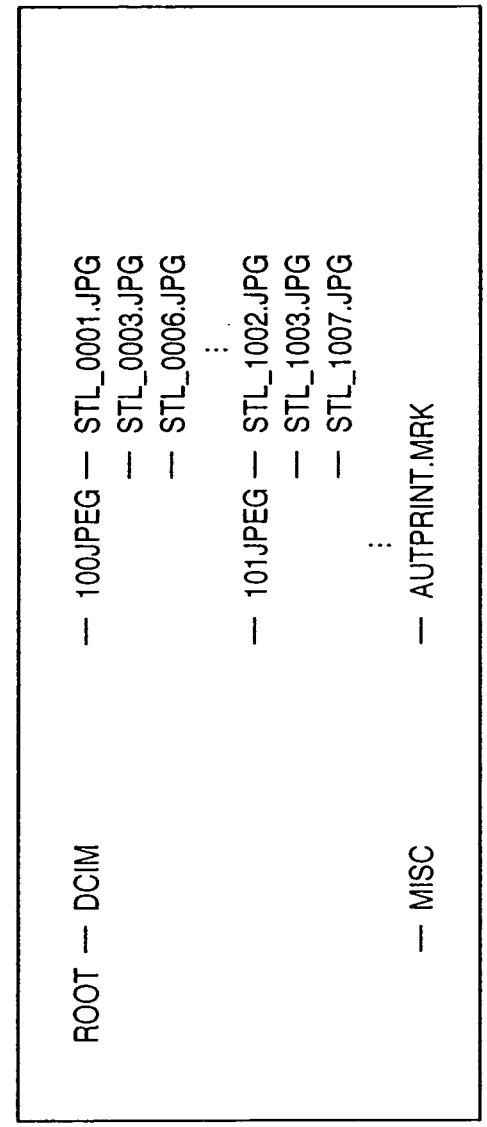
FIG. 15 is a view showing an example of a conventional directory arrangement.

FIG. 14 is a view for explaining an example of the directory arrangement of files recorded on a recording medium and a file producing sequence according to a modification to this embodiment.

Each embodiment described above has exemplified the case wherein MPEG files are recorded in only a moving image directory. However, when AVI (Audio Video Interleave) files are to be recorded in DCF, they may be recorded in the same directory as that of still image files. A case wherein still image files and moving image files are recorded in the same directory will be described under.

Referring to FIG. 14, still image directory "DCIM" exists under a root directory, and subdirectory "100ABC" exists under directory "DCIM". Under this subdirectory, there are recorded still image files with file names "STL_0001.JPG" and "STL_0002.JPG" and moving image files with file names "MOV_0003.AVI" and "MOV_0004.AVI".

In this case, when image capturing has been completed up to "MOV_0003.AVI" (the portion indicated by the dotted line), and a print instruction is issued for a desired frame at the time of replay of MOV_0003.AVI, (1) still image files with file names "STL_0005.JPG" and "STL_0006.JPG" are produced and recorded in directory "DCIM".

In addition, at the same time or concurrently with (1), (2) directory "MISC" is produced, and "AUTOPRINT.MRK" is produced as a print file under the directory. Print designation is then performed with respect to "STL_0005.JPG" and "STL_0006.JPG".

Note that pieces of information indicating that "STL_0005.JPG" and "STL_0006.JPG" have been produced by being extracted from moving image file "MOV_0003.AVI" are also recorded as attribute data of the still image files in the header or footer portions of the respective data of "STL_0005.JPG" and "STL_0006.JPG".

With this operation, when, for example, index display is to be performed, the still images extracted from moving image file "MOV_0003.AVI" can be arranged near display indicating the moving image. In addition, information indicating the relationship between the moving image and the still images, e.g., lines connecting them, can also be displayed.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-259980 filed Sep. 7, 2004, which is hereby incorporated by reference herein.

What is claimed is:

1. A record/replay apparatus comprising:
a file management unit configured to have a moving image directory and a still image directory;
a print file producing unit configured to produce a print list file for registering a still image file under the still image directory as a print object;
a still image extraction unit configured to extract a still image of a designated scene from a moving image file under the moving image directory; and
a control unit configured to control to display a still image under the still image directory and a moving image under the moving image directory on a display screen;
wherein when print designation is performed with respect to the still image of the designated scene from the moving image, the still image extracted by said still image extraction unit is recorded under the still image directory, and the still image is registered in the print list file by said print file producing unit,
wherein said control unit controls to display, on the display screen, a plurality of moving images under the moving image directory so that the plurality of moving images are disposed in a first direction and display, on the display screen, still images generated from the plurality of moving images displayed on the display screen so that the still images generated from each moving image are disposed from the vicinity of their original moving image in a second direction perpendicular to the first direction.

2. The apparatus according to claim 1, wherein
said file management unit further comprises a management file which manages files under the moving image directory and still image directory, and
when the print designation is performed with respect to the still image of the designated scene from the moving image, the still image is further registered as a moving image index in a management file.

3. The apparatus according to claim 2, wherein the moving image index is registered in a management file, and at the same time, at least one of pieces of additional information including print designation, a print execution history, a designated still image position, a style or layout, and a print count is registered.

4. The apparatus according to claim 1, wherein the print list file is in a format conforming to a digital print order format standard.

5. A record/replay apparatus comprising:
a file management unit configured to have a moving image directory and a still image directory;
a print file producing unit configured to produce a multi-index print list file for registering a plurality of still image files under the still image directory as a print object of a multi-index print;
a control unit configured to control to display a still image under the still image directory and a moving image under the moving image directory on a display screen; and
a first still image extraction unit configured to extract a plurality of still images of designated scenes from the plurality of moving image files under the moving image directory,
wherein the plurality of still images extracted by said still image extraction unit are recorded under the still image directory, and the plurality of still images are registered in the multi-index print list file by said print file producing unit;
wherein said control unit controls to display a plurality of moving images under the moving image directory so that the plurality of moving images are disposed in a first direction and display, on the display screen, still images generated, by said first still image extraction unit, from the plurality of moving images displayed on the display screen and registered in the multi-index print list file so that the still images generated from each moving image are disposed from the vicinity of the original moving image in a second direction perpendicular to the first direction.

6. The apparatus according to claim 5, further comprising a second still image extraction unit configured to extract still images of a plurality of designated scenes from a moving image file under the moving image directory.

7. The apparatus according to claim 6, wherein the plurality of designated scenes are designated by any one of sets of scenes of a moving image at predetermined intervals, scenes designated by a user, and scenes at image or sound change points.

8. The apparatus according to claim 5, wherein the print list file is in a format conforming to a digital print order format standard.

9. A record/replay apparatus which manages still images with a predetermined directory, comprising:
   a replay unit configured to replay a moving image recorded in a non-transitory recording medium;
   an extraction unit configured to extract a still image from the moving image replayed by said replay unit, and additionally recording the still image in the predetermined directory of the non-transitory recording medium; and
   a display control unit configured to control to display still images and moving images recorded on the non-transitory recording medium on a display device,
   wherein said display control unit controls to display a plurality of moving images so that the plurality of moving images are disposed in a first direction and display, on a display screen, still images generated from the plurality of moving images displayed on the display screen so that the still images generated from each image are disposed from the same vicinity of the original moving image in a second direction perpendicular to the first direction.

10. The apparatus according to claim 9, wherein said display control unit controls to display the plurality of still images generated from the same moving image so that the generated still images are arranged within one frame.

11. The apparatus according to claim 9, wherein said display control unit controls to display the plurality of still images generated from the same moving image so that the generated still images are assigned identical symbols.

12. The apparatus according to claim 9, wherein said display control unit controls to display a first slide bar for scrolling the images disposed in the first direction and a second slide bar for scrolling the images disposed in the second direction together with the moving image and still image.

13. The apparatus according to claim 9, wherein said display control unit controls to display a plurality of still images generated from the same moving image in the second direction, and if the plurality of still images generated from the same moving image can not be displayed in the display screen, display an index indicating that non-displayed still image exists.

14. The apparatus according to claim 9, wherein the non-transitory recording medium has a moving image directory and a still image directory,
   said extraction unit generates a still image of a designated scene from the moving image recorded in the moving image directory and records the generated still image in the still image directory,
   wherein further comprising a print list producing unit configured to produce a print list for printing a still image recorded in the still image directory,
   when a print order of the designated scene of the moving image recorded in the moving image directory said print list producing unit records is issued, said extraction unit produces a still image corresponding to the designated scene and records the generated still image in the still image directory, and the generated still image is registered in the print list.

15. The apparatus according to claim 9, wherein said extraction unit records a still imaged generated from the moving image by adding information for identify the original moving image from which the still image is generated.

16. A record/replay method for an apparatus including a file management unit configured to have a moving image directory and a still image directory, a print file producing unit configured to produce a print list file for registering a still image file under the still image directory as a print object, and a still image extraction unit configured to extract a still image of a designated scene from a moving image file under the moving image directory, comprising:
   when print designation is performed with respect to the still image of the designated scene from the moving image, recording the still image extracted by the still image extraction unit under the still image directory;
   registering the still image in the print list file by the print file producing unit; and
   controlling to display a still image under the still image directory and a moving image under the moving image directory on a display screen,
   wherein said controlling comprises controlling to display, on the display screen, a plurality of moving images under the moving image directory so that the plurality of moving images are disposed in a first direction and display, on the display screen, still images generated from the plurality of moving image so that the still images generated from each moving image are disposed from the vicinity of their original moving image in a second direction perpendicular to the first direction.

17. A non-transitory computer-readable storage medium storing a program for causing a computer to execute an image record/replay method defined in claim 16.

18. A record/replay method for an apparatus including a file management configured to have a moving image directory and a still image directory, a print file producing unit configured to produce a multi-index print list file for registering a plurality of still image files under the still image directory as a print object of a multi-index print, and a first still image extraction unit configured to extract a plurality of still images of designated scenes from the plurality of moving image files under the moving image directory, comprising:
   recording the plurality of still images extracted by the still image extraction unit under the still image directory;
   registering the plurality of still images in the multi-index print list file by the print file producing unit; and
   controlling to display a still image under the still image directory and a moving image under the moving image directory on a display screen,
   wherein said controlling comprises controlling to display a plurality of moving images under the moving image directory so that the plurality of moving images are disposed in a first direction and display, on the display screen, still images generated, by said first still image extraction unit, from the plurality of moving images displayed on the display screen and registered in the multi-index print list file so that the still images generated from each moving image are disposed from the vicinity of the original moving image in a second direction perpendicular to the first direction.

19. A non-transitory computer-readable storage medium storing a program for causing a computer to execute an image record/replay method defined in claim 18.

20. A record/replay method for an apparatus which includes a replay unit configured to replay a moving image recorded on a non-transitory recording medium, and an extraction unit configured to extract a still image from the moving image replayed by the replay unit, and additionally recording the still image in the predetermined directory of the non-transitory recording medium, and manages still images with a predetermined directory, comprising:

a display control step of displaying still images and moving images recorded on the non-transitory recording medium on a display device, wherein in the display control step, a plurality of moving images are displayed so that the plurality of moving images are disposed in a first direction and still images generated from the plurality of moving images displayed on the display screen are displayed, on the display screen, so that the still images generated from each moving image are disposed from the same vicinity of the original moving image in a second direction perpendicular to the first direction.

21. A non-transitory computer-readable storage medium storing a program for causing a computer to execute an image record/replay method defined in claim 20.

22. A display control apparatus comprising:

a read-in unit configured to read-in, from a non-transitory recording medium, a moving image recorded in the non-transitory recording medium and a still image generated from the moving image; and a control unit configured to control to display, on a display screen, a plurality of moving images and still images recorded in the non-transitory recording medium, wherein said control unit controls to display the plurality of moving images recorded in the non-transitory recording medium so that the plurality of moving images are disposed in a first direction and display, on the display screen, still images generated from the plurality of moving images displayed on the display screen so that the still images generated from each moving image are disposed from the vicinity of the original moving image in a second direction perpendicular to the first direction.

23. The apparatus according to claim 22, wherein said control unit controls to display a first slide bar for scrolling the images disposed in the first direction and a second slide bar for scrolling the images disposed in the second direction together with the moving image and still image.

24. The apparatus according to claim 22, wherein said control unit controls to display the plurality of still images generated from the same moving image in the second direction, and if the plurality of still images generated from the same moving image can not be displayed in the display screen, display an index indicating that non-displayed still image exists.

25. The apparatus according to claim 22, wherein said control unit controls to display the plurality of still images generated from the same moving image so that the generated still images are arranged within one frame.

26. The apparatus according to claim 22, wherein said control unit controls to display the plurality of still images generated from the same moving image so that the generated still images are assigned identical symbols.

27. The apparatus according to claim 22, wherein said control unit controls to display a representative image of the moving images to be displayed.

28. The apparatus according to claim 22, wherein said read-in unit reads-in, from the non-transitory recording medium, the moving images and the generated still images, and information specifying the original moving image of the generated still images.

29. The apparatus according to claim 22, wherein said control unit displays the plurality of moving images recorded on the non-transitory recording medium, and still images from which the still images generated from a moving image are excluded in the first direction in a predetermined order.

30. A control method of a display apparatus comprising the steps of:

reading-in, from a non-transitory recording medium, a moving image recorded in the non-transitory recording medium and a still image generated from the moving image; and controlling to display, on a display screen, a plurality of moving images and still images recorded in the non-transitory recording medium, wherein in said control step, a plurality of moving images recorded in the non-transitory recording medium are displayed so that the plurality of moving images are disposed in a first direction and display, on the display screen, still images generated from the plurality of moving images displayed on the display screen so that the still images generated from each moving image are disposed from the vicinity of the original moving image in a second direction perpendicular to the first direction.

* * * * *